United States Patent
Chiu et al.

(10) Patent No.: US 6,808,123 B2
(45) Date of Patent: Oct. 26, 2004

(54) MIXING FAUCET HAVING MULTIPLE DISCHARGES

(76) Inventors: Edward Samson Chiu, 581 Campbell Ave., Windsor, Ontario (CA), N9B 2H5; Albert Herman Chiu, 581 Campbell Ave., Windsor, Ontario (CA), N9B 2H5; Samuel Chiu, 581 Campbell Ave., Windsor, Ontario (CA), N9B 2H5

(*) Notice: Subject to any disclaimer, the term of this patent is extended or adjusted under 35 U.S.C. 154(b) by 261 days.

(21) Appl. No.: 10/045,082

(22) Filed: Jan. 15, 2002

(65) Prior Publication Data

US 2003/0132306 A1 Jul. 17, 2003

(51) Int. Cl.[7] ............................... B05B 12/14
(52) U.S. Cl. ............ 239/25; 239/24; 239/29; 239/29.5; 239/581.2
(58) Field of Search ............ 239/16, 24, 25, 239/29, 29.5, 12, 548, 569, 581.1, 581.2, 582.1, 436, 438, 443, 445

(56) References Cited

U.S. PATENT DOCUMENTS

| | | | |
|---|---|---|---|
| 3,030,029 A | * | 4/1962 | Slater, Jr. ............ 239/25 |
| 3,965,937 A | | 6/1976 | Reber |
| 4,448,351 A | * | 5/1984 | Aldinger et al. ......... 239/25 |
| 5,195,681 A | | 3/1993 | Chyen |
| 5,634,220 A | | 6/1997 | Chiu |
| 5,823,229 A | | 10/1998 | Bertrand et al. |
| 5,871,032 A | | 2/1999 | Ko |
| 5,887,796 A | | 3/1999 | Dimmer |
| 6,085,790 A | | 7/2000 | Humpert et al. |
| 6,093,313 A | | 7/2000 | Bovaird et al. |
| D441,835 S | | 5/2001 | Costello et al. |
| 2001/0044955 A1 | | 11/2001 | Brandebusemeyer |

\* cited by examiner

*Primary Examiner*—Davis Hwu

(57) ABSTRACT

A faucet having a plurality of water discharges includes a housing, diverter valve within the housing, a stream discharge on the housing, an upward fountain discharge on the housing, and an upward spray discharge on the housing. The diverter valve connects the mixed water conduit to the water discharges. A handle external to the housing engages the diverter valve to selectively define a flow path between the mixed water supply and the selected water discharge.

7 Claims, 5 Drawing Sheets

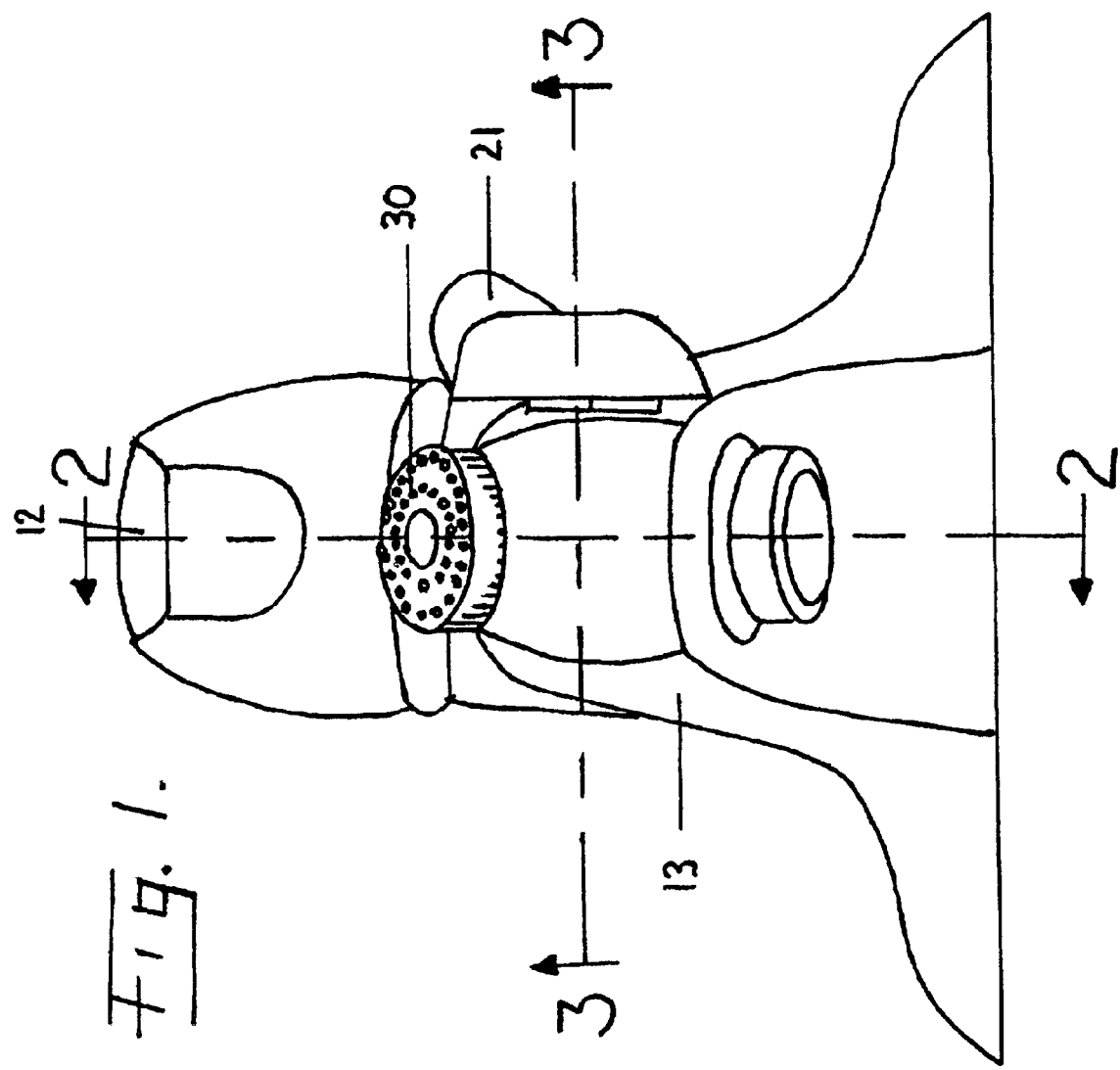

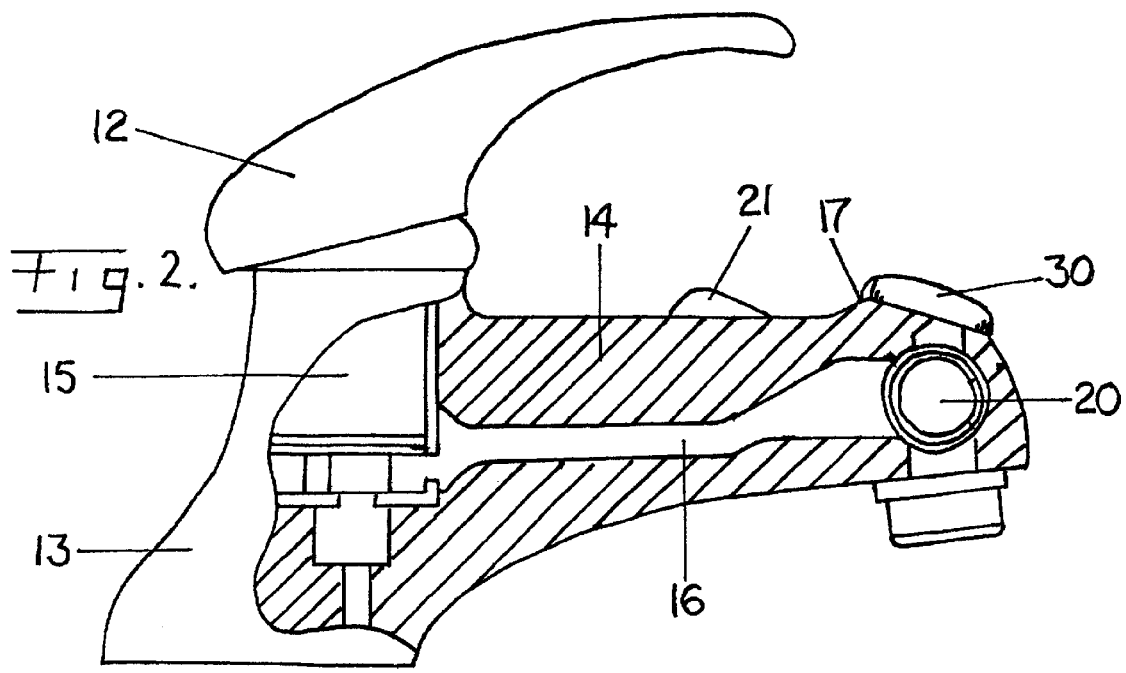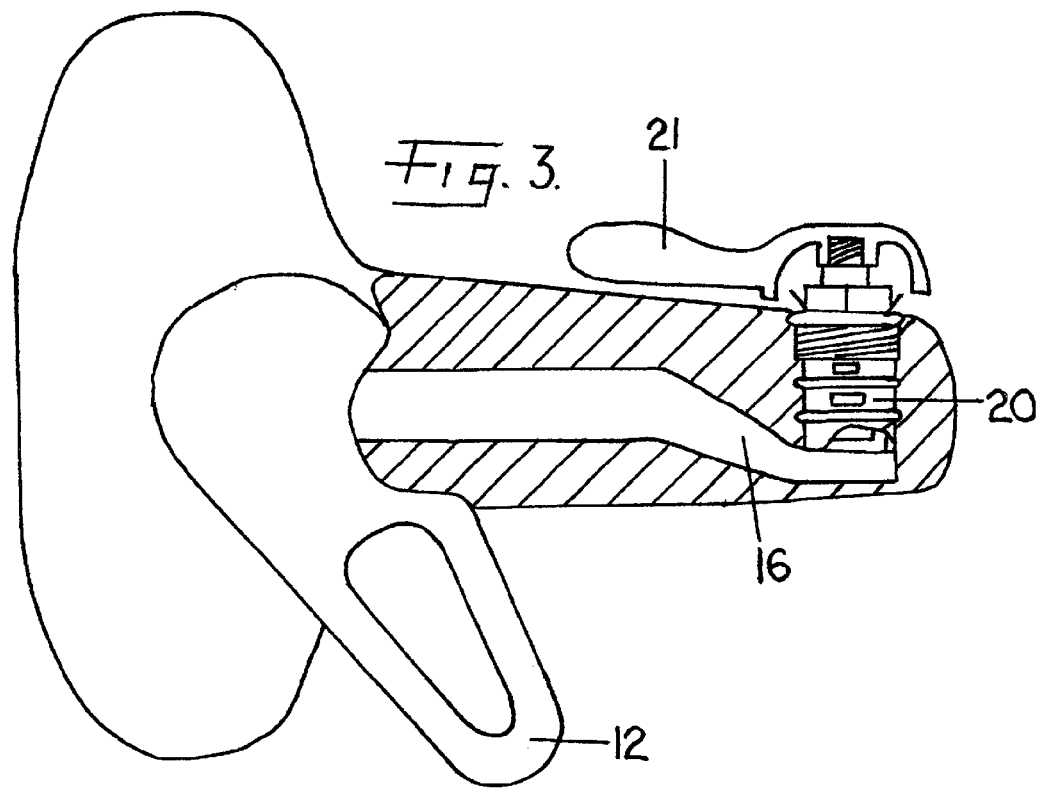

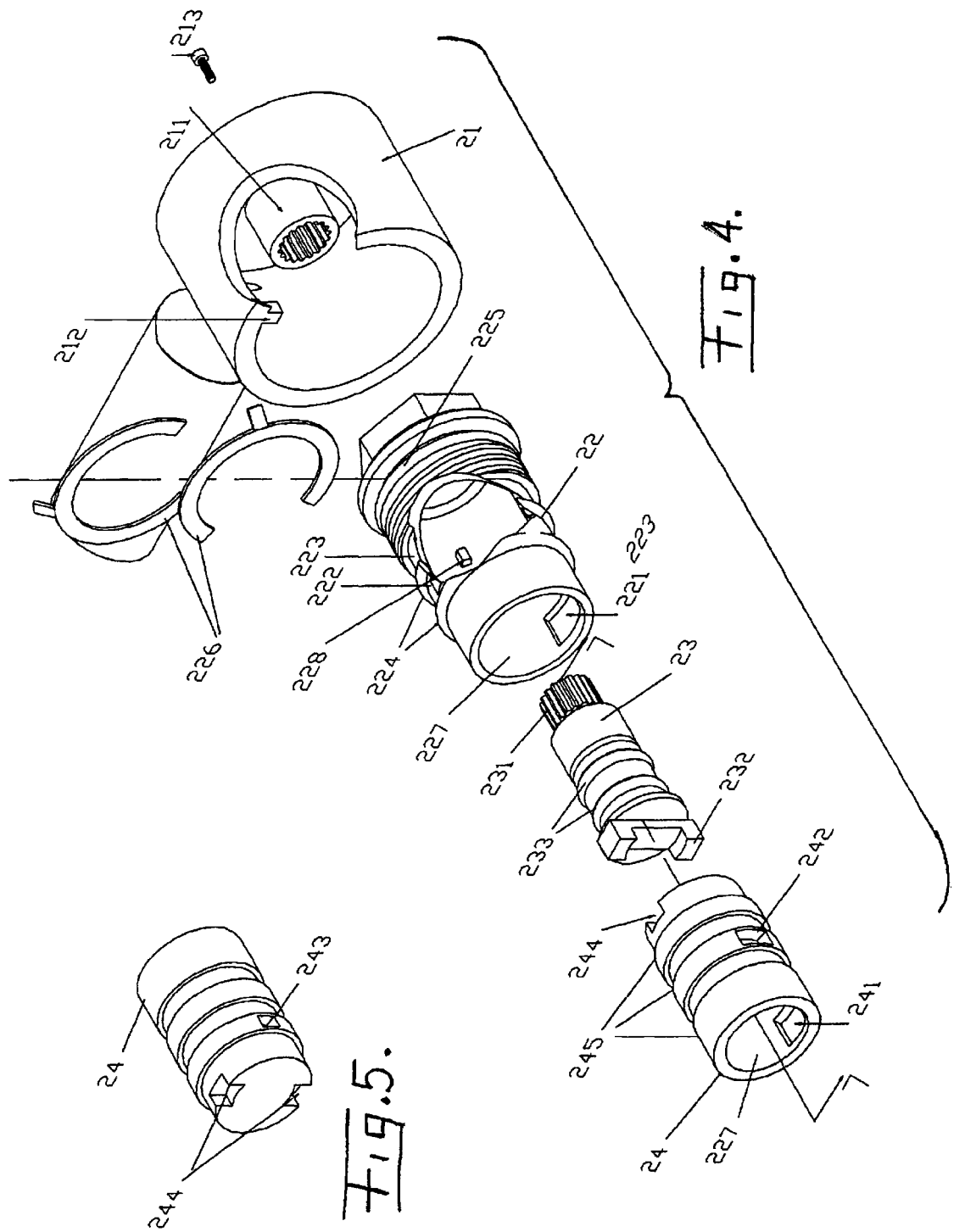

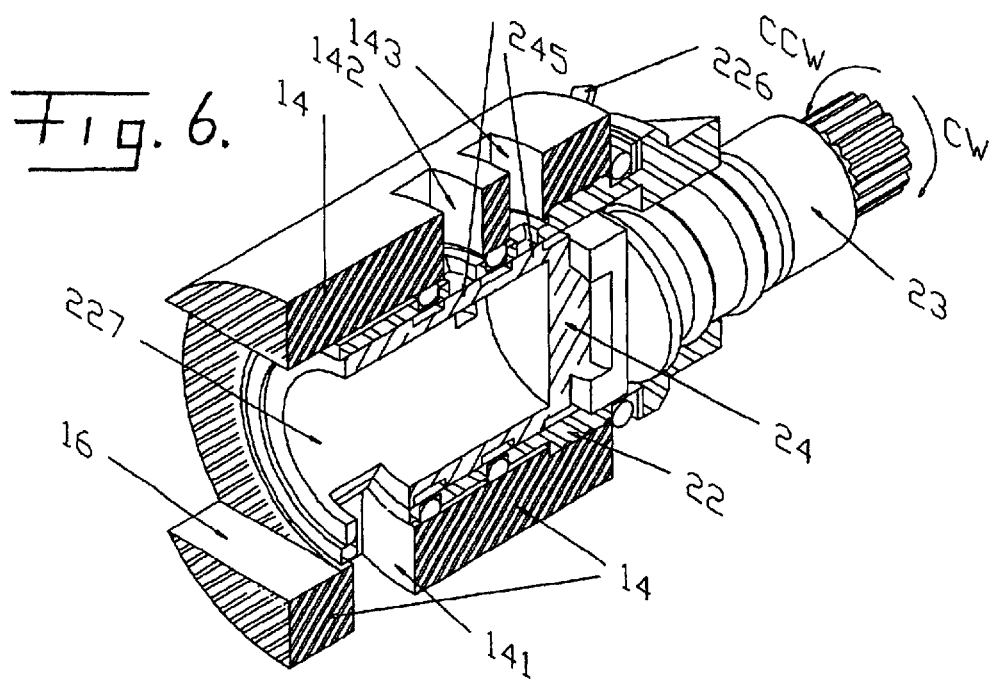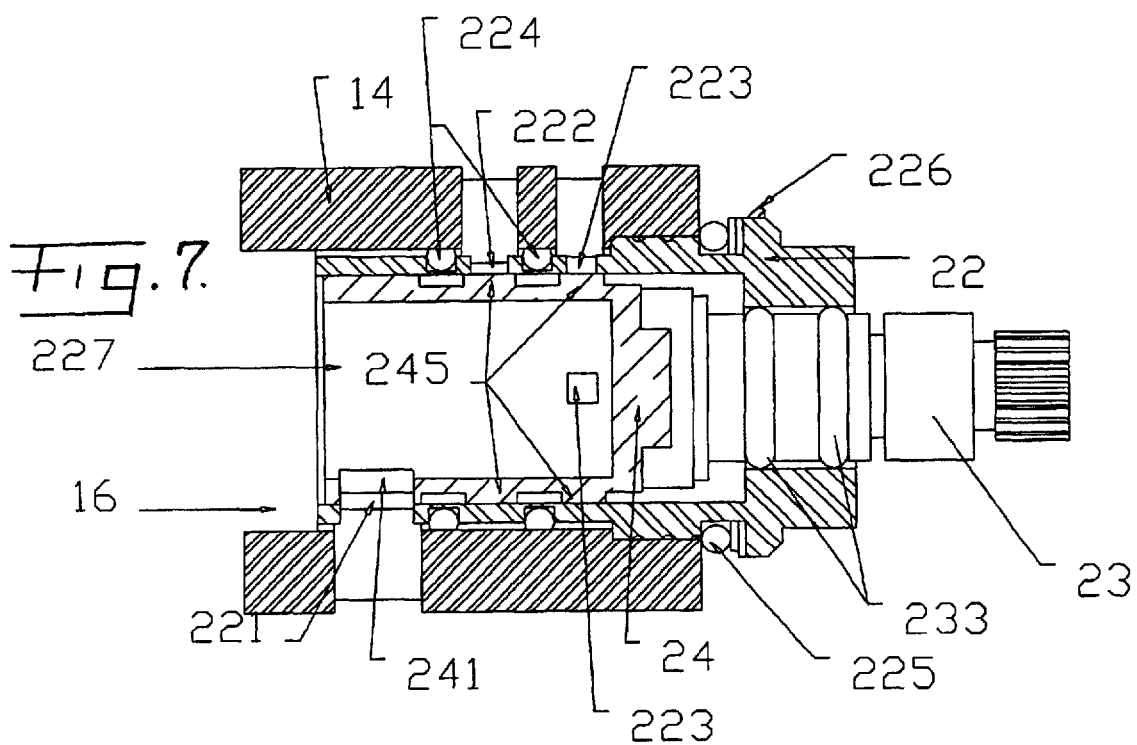

MIXING FAUCET HAVING MULTIPLE DISCHARGES

CROSS-REFERENCE TO RELATED APPLICATIONS

Not applicable

STATEMENT REGARDING FEDERALLY SPONSORED RESEARCH OR DEVELOPMENT

Not applicable

REFERENCE TO SEQUENCE LISTING, A TABLE, OR A COMPUTER PROGRAM LISTING COMPACT DISK APPENDIX

Not applicable

BACKGROUND OF THE INVENTION

The present invention relates to a faucet having multiple water discharges that vary in pattern and direction. The invention has many applications beyond the currently described application as a vanity faucet. The faucet may be based upon any standard mixing or two handle faucet; the invention applies downstream of the mixed water conduit. A diverter valve selectively channels the mixed water stream to any of a plurality of water discharges. The valve is controlled by an externally mounted selector handle with positions for each of the discharges. In addition to the typical downward stream discharge, two upward discharges, namely a fountain discharge and a spray discharge, may be selected. Rotation of the handle facilitates flow control for any of the output positions while restricting simultaneous flow output to only the selected discharge. Rotation position of the handle follows a sequence of upward-downward-upward; two user-adjustable stops define the limits of handle rotation, effectively acting as flow rate limiters for the two upward discharges. The adjustable diffuser cap offers an alternative method of switching between upward fountain and spray discharges.

Traditional vanity faucets with only downward discharges are adequate for tasks such as washing hands, but represent a compromise for washing the face: the user must apply the water with a towel or manually redirect it with his hands; the process is inefficient as most of the water flow goes unused. An upward spray discharge is desirable to directly apply a gentle spray of water to the face. The additional option of a fountain discharge provides a convenient means for drinking and rinsing without using a cup. The upward flow rate is a fraction of the downward discharge rate, significantly reducing the amount of wasted water resulting in tangible economic benefits for the user and environmental benefits overall.

BRIEF SUMMARY OF THE INVENTION

The present invention relates to faucets for use in bathroom environments and specifically to a faucet with a downward spray discharge, reduced flowrate upward fountain and spray discharges, and an external handle to select amongst the modes.

A primary purpose of the invention is a vanity faucet as described that includes a user-controllable valve to direct water flow amongst the various discharges.

Another purpose is a vanity faucet as described that includes user-adjustable handle stops to limit the flow rates of the two upward discharges.

Another purpose is a vanity faucet as described, which alternates between fountain and spray discharges based on the rotational alignment of the upward diffuser cap offering the user an additional method of selecting the desired upward discharge.

Other purposes will appear in the ensuing specification, drawings and claims.

BRIEF DESCRIPTION OF THE SEVERAL VIEWS OF THE DRAWING

The invention is illustrated diagrammatically in the following drawings wherein:

FIG. 1 is a front view of the multiple discharge means as it would be implemented in a single handle vanity faucet.

FIG. 2 is a side view of the diverter valve assembly as it would be used in a single handle vanity faucet with parts of the mixing valve and faucet housing shown in section. Sectional portions are taken along line 2—2 of FIG. 1.

FIG. 3 is a top view of the diverter valve assembly as it would be used in a single handle vanity faucet with parts of the faucet housing shown in section. Sectional portions are taken along line 3—3 of FIG. 1.

FIG. 4 is an exploded perspective view showing the components that make up the diverter valve assembly and selector handle assembly.

FIG. 5 is a rear perspective view of the flow diverter showing the shaft engagement points and spray discharge outlet.

FIG. 6 is a cutaway perspective view of the diverter valve assembly and faucet housing showing the shaft engaging the flow diverter spool.

FIG. 7 is a sectional view of the diverter valve assembly and faucet housing taken along line 7—7 of FIG. 4.

Figure 8:
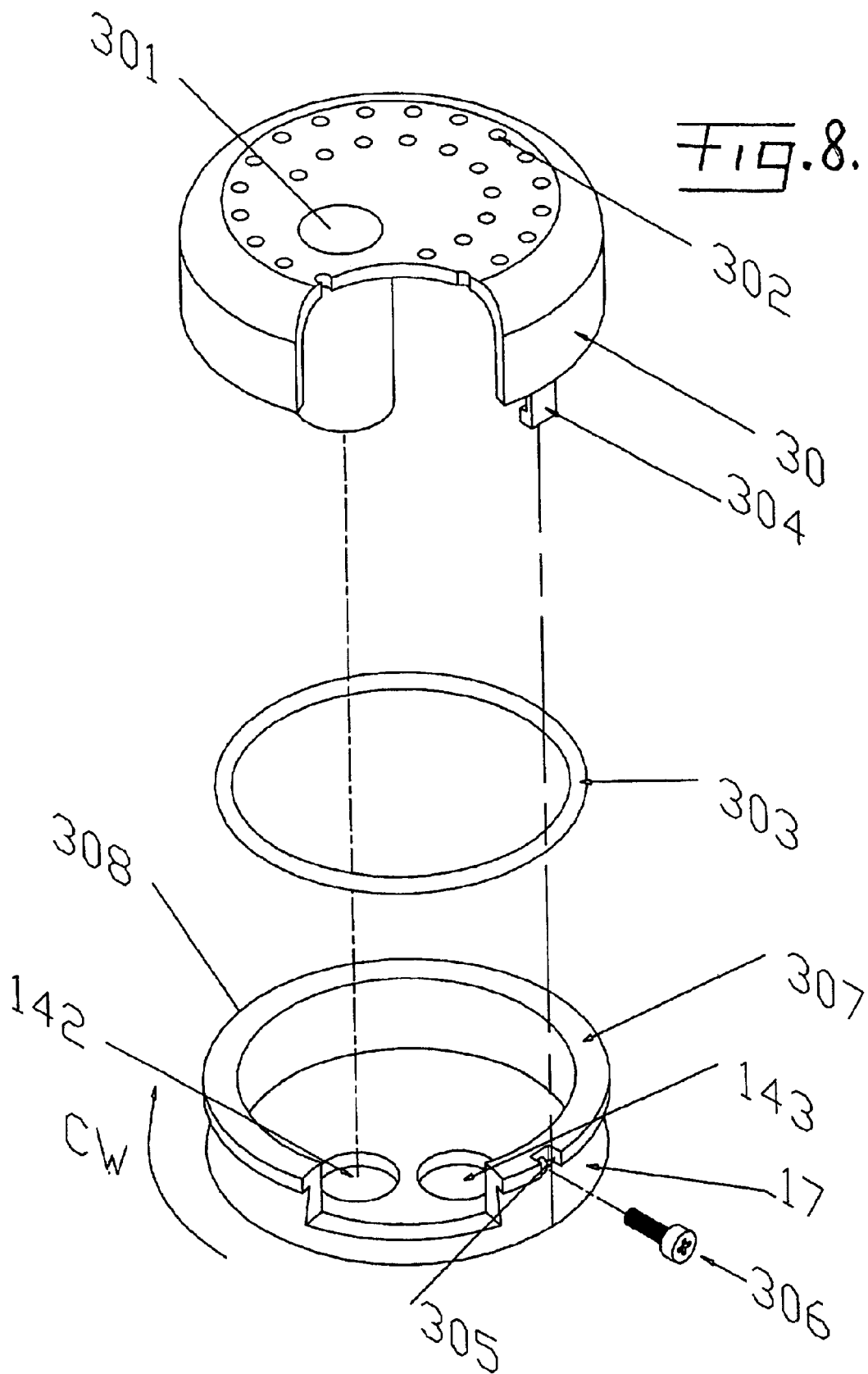
FIG. 8 is an exploded view showing the parts of the diffuser cap assembly and faucet body receiver.

It is duly noted that drawings are for functional understanding, may not be to scale, and that embodiments may be illustrated using graphic symbols, phantom lines, and diagrammatic representations. Details that are not critical to the understanding of the present invention or may otherwise complicated or obscure other details may be omitted. It is understood that the present invention is not limited to the particular embodiment illustrated.

DETAILED DESCRIPTION OF THE INVENTION

The present invention relates to a faucet principally intended for use in the bathroom environment. It consists of a regular single handle-mixing valve or two-handle control valve faucet connected to a diverter valve assembly that in turn is connected to a plurality of water discharges.

The faucet, and specifically the diverter valve assembly, provides the option of stream discharge, reduced flowrate upward fountain discharge, and reduced flowrate upward spray discharge. The user rotates the external handle to divert water flow to a chosen discharge. In addition to discharge selection, the position of the handle is not limited to discrete positions and may be used to control the flowrate of the discharge. The rotatable diffuser cap of the upper discharges offers the user an alternative method of selecting between fountain and spray discharge.

The faucet is shown in FIGS. 1–3 with a single handle-mixing valve. An external handle 21 engages the diverter valve assembly 20. The faucet body 13 encloses a housing 14, which contains a mixing valve cartridge 15. A mixed water conduit 16 directs mixed water from the mixing valve to the inlet 227 of the diverter valve assembly. The position of the faucet handle 12 controls the proportion of hot and cold water entering the mixed water conduit 16. The faucet handle 12 and mixing valve cartridge 15 serve only to provide mixed water to the diverter valve assembly and are not claimed in the present invention. The above-mentioned parts assembled as described hereafter afford the three varying types of water discharge in accordance to the rotational position of the diverter handle 21.

FIG. 4 illustrates the main components of the diverter valve assembly, which will be discussed in detail hereafter. The diverter valve assembly includes a cylindrical housing 22, rotatable shaft 23, and flow diverter spool 24. The rotatable shaft consists of a threaded end 231 facilitating the attachment of the selector handle 21, by the threaded receiver 211 and set screw 213. Oppositely located to the threaded end is the engagement fork 232 for engagingly connecting the flow diverter. FIG. 5 illustrates the recessed shaft engagement points 244 on the rear of the flow diverter.

As illustrated in FIGS. 4–7 the diverter valve housing has an outlet associated with each water discharge: downward stream discharge outlet 221, upward fountain discharge outlet 222, and upward spray discharge outlet 223. The flow diverter spool has three outlets that may be selectively aligned with the housing outlets to define a single flow path. On the flow diverter, the stream discharge outlet is aligned by default to form a flow path, whereas the fountain discharge outlet 242 is axially offset by a quarter turn and the spray discharge outlet 243 is axially offset by a quarter turn in the opposite direction. Hence with the attached handle in the middle position, water is directed to exit through the downward stream discharge, while a quarter turn in either direction will direct the water flow to one of the respective upward discharges. As illustrated in FIGS. 6 and 7 each outlet on the diverter valve housing exits to a conduit connected to the appropriate water discharge. In the described embodiment water is directed to the downward stream discharge conduit 141 when the handle is in the middle position. Based on the orientation of FIGS. 4 and 6 and starting from the middle handle position, a counter-clockwise quarter turn diverts water to the fountain discharge conduit 142 and a clockwise quarter turn diverts water to the spray discharge conduit 143. The outlets are radially spaced to prevent another outlet from opening before the currently selected outlet is completely sealed. FIGS. 6 and 7 illustrate the flow path defined to the downward stream outlet and the two upward outlets sealed closed.

The circumferential seals 245 illustrated in FIG. 4 are the same diameter as the interior of the diverter valve housing. The circumferential seals seat against the interior of the housing to seal off unselected outlets and seal the perimeter of the selected outlet to prevent water from leaking into the housing. Mixed water enters from the diverter valve inlet 227 and can exit through only the selected outlet. In FIG. 7 the flow diverter spool is aligned to allow water to exit the downward stream outlet 221. The perimeter of the stream outlet on the spool 241 is sealed against the interior of the diverter valve housing and the unselected housing outlets 222 and 223 are sealed closed by the circumferential seals 245. O-rings 224 are used to seal diverter valve outlets to their respective conduits and prevent water from continuing to unselected discharges. A ring seal at the inlet end 227 has been omitted from illustrations to provide a clear view of the ends of the diverter valve assembly; the seal serves to prevent leakage into the downward stream conduit 141.

The shaft rotation stop 228 comes in contact with the shaft fork when the shaft is rotated beyond the range of rotation required for the three outlets. FIG. 4 illustrates the user-adjustable means of setting the upper limits of the two upward water discharges. A pair of ring stops 226 further limit the amount of axial rotation the shaft may undergo. Limiting the range of counter-clockwise rotation restricts the fountain discharge flow rate and limiting the clockwise rotation restricts the spray discharge flow rate. Each stop ring includes a tab that when in contact with the handle stop 212 prevents the handle from rotationally exceeding that position. The stop rings are positioned by the user and secured by pressure between the faucet body and the diverter valve when the valve is bolted in place.

The upward discharge diffuser cap assembly 30 is illustrated in FIG. 8. The rotatable diffuser cap assembly is characterized by a retaining hook 304, spray discharge diffuser 302, and fountain discharge duct 301. An O-ring seal 303 installed between the diffuser cap assembly and the receiver 17 on the faucet body 13 prevents leakage. The retaining hook is inserted through the notched opening 305 on the receiver and the diffuser cap is rotated clockwise to allow room for the stop screw 306. During installation pressure is required to compress the O-ring 303 and allow the retaining hook to clear the receiver lip 307. The fountain discharge duct forms a seal with the receiver floor 308 and when aligned with the fountain conduit 142 defines the path for a fountain discharge. When the diffuser cap is rotated clockwise as to break the fluid communication between the fountain discharge duct and fountain conduit, the conduit exits into the interior of the diffuser cap and water exits as a spray discharge. The stop screw prevents the retaining hook 304 from releasing at the receiver notch 305 and prevents the duct 301 from aligning with the spray discharge conduit 143. Thus, the diffuser cap, when used in a rotatable manner, offers an alternative means of selecting between the two upward discharges. Instead of using three positions on the selector handle 21, only the downward discharge and upward fountain discharge positions are used in conjunction with the rotatable diffuser cap to select amongst the three discharges.

Whereas the preferred form of the invention has been shown and described herein, it should be realized that there may be many modifications, substitutions and alterations thereto.

We claim:

1. A faucet having multiple water discharges including a housing, comprising: an input water connection for said housing, a downward discharge outlet on said housing, an upward discharge outlet on said housing, a diverter valve control means within said housing, manual means accessible from the exterior of said housing for operating said diverter valve control means to selectively divert water from said input to any of said discharge outlets, said diverter valve control means having an input connection connected to said housing input water connection and a plurality of output connections, and means to selectively define a flow path from said input connection to any of said output connections, wherein said upward discharge outlet consists of a single diffuser cap assembly having two different user selectable water discharges.

2. The faucet of claim 1 wherein said diverter valve of claim 1 comprises:

a valve housing characterized by an interior cavity enclosing an axially elongated space having a fluid inlet and a plurality of outlet connections, a flow diverter spool having multiple fluid outlets, axially rotatable in a plurality of positions, means for connecting said valve to said faucet in fluid communication, means of defining flow path from said fluid inlet to any single fluid outlet, a multi-position handle and a shaft operatively associated with said flow diverter, having a specific position associated with each outlet, wherein a flow path is defined from the faucet inlet through said valve and exiting only through the specified discharge outlet, means of defining absolute upper and lower rotation limits of said shaft, manual means accessible from the exterior of said housing for adjusting upper and lower rotation limits of said handle, seal means operatively associated with said flow diverter and interior of said housing wherein when said valve means is in position for fluid communication between fluid inlet and selected outlet, seal means prevents fluid flow through remaining outlets, and seal means operatively associated with the exterior of said valve and said faucet housing wherein output conduits are individually sealed to prevent cross flow.

3. The faucet of claim 2 wherein said flow diverter spool has a smaller diameter than the interior of said diverter valve interior characterized by: an open end through which fluid communication is established with said diverter valve input, an oppositely located closed end, facilitating engagement by said handle means, a plurality of outputs circumferentially aligned adjacent to said open end, each of said outputs encircled by a circumferential ring acting as a seal means between said flow diverter and said diverter valve interior.

4. The faucet of claim 2 wherein said handle assembly comprises: a handle external to the faucet body, a shaft engagingly connected to said handle and said diverter spool, said adjustable upper and lower rotation limit means further characterized by a protruding tab on the interior surface of said handle and a pair of rings with protruding tabs, wherein when said stop rings are secured between said diverter valve and said faucet body so that said handle tab interfaces with said stop ring tabs to define the limits of rotation for said handle assembly.

5. The faucet of claim 1 wherein the selection of said upper discharges is alternatively facilitated by an axially rotatable diffuser cap assembly in fluid communication with said upward outlet on said faucet housing, said diffuser cap comprises a central fountain duct for said fountain discharge means and a diffuser for said spray discharge means, wherein said fountain outlet, dependent on axial alignment, is alternatively in fluid communication with said upper fountain conduit, sealed closed, to define the flow path between said conduit and said diffuser means for said spray discharge.

6. The faucet of claim 5 wherein said fountain discharge means is suitable for drinking water from said upward outlet.

7. The faucet of claim 5 wherein said spray discharge means is suitable for rinsing one's face from said upward outlet.

* * * * *